R. RODERWALD.
PACKING FOR BEARINGS.
APPLICATION FILED JUNE 24, 1913.
1,152,223.
Patented Aug. 31, 1915.
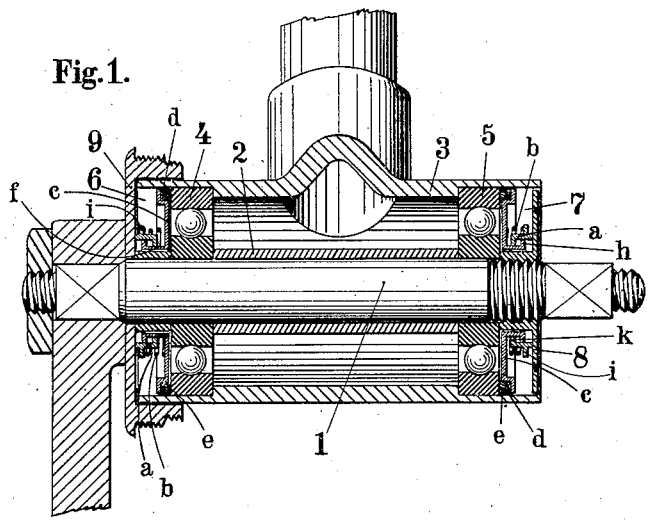
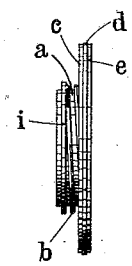
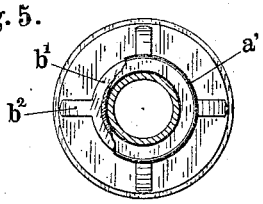
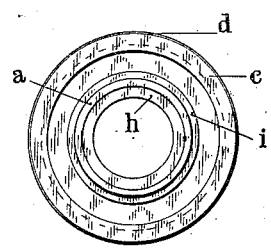
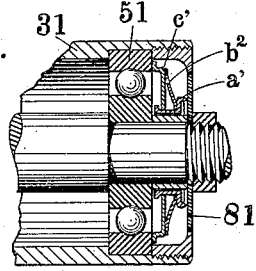
Witnesses
Fenton St Belt
W. Wallace Nairn
Inventor
Rudolf Roderwald

UNITED STATES PATENT OFFICE.

RUDOLF RODERWALD, OF BERLIN, GERMANY.

PACKING FOR BEARINGS.

1,152,288.

Specification of Letters Patent.  Patented Aug. 31, 1915.

Application filed June 24, 1913. Serial No. 775,574.

*To all whom it may concern:*

Be it known that I, RUDOLF RODERWALD, a subject of the Duke of Anhalt, residing at No. 35a Tempelhofer Ufer, Berlin, Germany, have invented new and useful Improvements in Packings for Bearings, of which the following is a specification.

The invention relates to a device for packing bearings for vehicles and other appliances, such as shaftings, machinery and the like, which packing is so constructed that the penetration of dust, water or other impurities and the leakage of the lubricant are effectively prevented.

The object of my invention is to produce a tight joint without the application of any soft or fibrous material (which packing substances are liable to become hard or will shrivel), merely by the use of packing members of metal or like materials, sliding the one upon the other with their contacting faces under a slight pressure, and thus do away with all channels and reduce friction to a minimum. This object is attained by the provision of two packing members positively united but axially displaceable the one with respect to the other, a spring inserted between the members tending to move them apart in opposite directions, so that they are respectively pressed against stationary and rotating parts of the bearing, such as the casing and the shaft or the axle and the hub barrel, respectively, producing a tight joint by closely bearing on the lateral faces of the said parts. Since the two packing members are also guided the one upon the other with a tight fit, there are no passages from the interior of the bearings to the atmosphere. The packing members are so constructed that attaching and removing of the device can easily and readily be effected.

The packing is practical particularly by its elasticity and capability of automatic adjustment which insures that the faces forming the joint can bear perfectly against each other, and also by the feature that the joint proper is formed only at one place, the disk-shaped packing member being so connected with one portion of the bearing that a tight joint is formed between these two parts. The connection of the two packing members is effected by a flange provided on the disk, upon which flange a ring or sleeve is guided which fits so tightly over it that no oil can flow through the cleft, but relative displacement between them can occur owing to the action of the spring located between the two parts. One end of this sleeve bears against a disk-shaped cover-plate mounted on the other part of the bearing and thus packs the bearing. Since very little pressure is required to hold the two surfaces in close contact, in order to form a tight joint, and since these abutting surfaces can be of very small area, only a small amount of friction results. In this device compensation is automatically made for variations in the dimensions of the bearing which may occur by extension or contraction.

Three constructional forms of the invention are represented by way of example in the drawing, in which:

Figure 1 is a longitudinal section of an axle-bearing provided with the new packing. Figs. 2 and 3 show the packing in end and side elevations, respectively. Figs. 4 and 5 are a sectional elevation and a front view respectively of a modified form of the device, and Fig. 6 is a further modified construction.

In the example illustrated in Figs. 1 to 3, the device is shown applied to the bearing of a crank axle. The axle 1 is located in the interior of a casing 3 rigidly connected with the cycle-frame, and supported by the ball-bearings 4 and 5 of the ring type with race-grooves which are held apart by the distance-sleeve 2.

The packing appliances forming the subject-matter of the invention are arranged at the ends of the bearing bracket 3 at 6 and 7, and each packing comprises a metal disk $c$ which is so formed as to admit of the insertion of a leather packing ring $d$, which is secured in position by a metal ring $e$. This leather packing ring $d$ which fits so tightly in the casing 3 that the metal disk $c$ remains stationary with the latter, forms a tight joint at the periphery of the disk $c$.

The disk $c$ has adjacent to its bore an outwardly projecting flange $f$, which surrounds the axle 1, but does not come into contact with the disk-shaped cover-plates 8 or 9, respectively mounted on the axle. Upon the flange $f$ is guided a laterally movable sleeve $a$ which is lightly pressed by a comparatively weak spring $b$ against the opposite cover-plates 8 or 9, whereby a perfect contact between the abutting faces is maintained in the entire circumference. The reaction of the spring also presses the disks c on the outer sides of the bearing rings 4 and 5 respectively and secures them in their proper position. The end face or edge of the sleeve a which bears against the coverplate can be made so small that no appreciable frictional resistance occurs at this place, and on that account the sleeves a, although continually bearing against the walls 8 or 9, do not participate in their rotation but, together with the disk c, always remain at rest. For this object the said end of the sleeve a may be sharpened or rounded off, as illustrated in Fig. 4, in order to keep the contracting surface as small as possible. For the same reason the spring b is only just strong enough to keep the abutting faces of the sleeves a in contact with the disks 8 or 9. Moreover, as a special safeguard against rotation the sleeve a may be longitudinally guided upon the extension or flange f of the disk c by suitable means, such as groove and key. At the free extremity of the flange f an upset border h is formed, while the inner extremity of the sleeve a is provided with a similar but inwardly directed annular projection k, by means of these projections the two packing members c and a are always in positive engagement and held together when they are withdrawn from the barrel 3. The spring bears with its one extremity against the disk c and acts with its other end upon a flange i of the sleeve a. The axial displacement of the sleeve a can be obtained either by flat spiral springs, as represented in Figs. 1 and 2, or by a resilient metal plate or spider having an annular body b' and a plurality of arms b² (Figs. 4 and 5).

If desired, the flanges f of the disks c can be dispensed with, the sleeves a' being then guided by and freely movable in the bore of the disks c', as shown in Figs. 4 and 5, in which the disk member c' bears with its flanged edge against the lateral face of a bearing ring 51 fixed in a hub barrel 31, while the sleeve a' is axially displaceable in the bore of said disk and is acted upon by the spring member b' and b² and pressed on the cover 81 attached to the axle 11. In this construction both the disk c' and the sleeve a' are adapted to slide peripherally on the respective parts with which they are held in closed and tight contact by the spring member and adjusted automatically.

Referring to the modification illustrated in Fig. 6, the packing device consists of a ring c², f² of angular cross-section and a sleeve a² having its outer end enlarged. A spring b³ inserted between the two members tends to move them apart, thereby pressing them on the lateral faces of the cone 10 of the ball bearing and of the cover 82 of a hub 32, respectively. In this construction the hub 32 is the rotating part and the axle 21 remains stationary.

I have described in the foregoing specification and illustrated in the drawing several constructional embodiments of my invention for the purpose of exemplification. Evidently the new device may be modified in several ways, without departing from the principle of the invention. I therefore do not wish to be limited to those constructions, but What I broadly claim as my invention, and desire to secure by Letters Patent, is:

1. A packing for bearings comprising a cylindrical member having a wide radially extending flange at one end, a member slidably fitted upon the cylindrical portion of the first member and also having a radially extending flange, an expansive spring interposed between the opposed flanges of the said members and tending to move the members apart, said members also having shallow opposed flanges to limit the separating movement of said members.

2. A packing for bearings comprising two spaced apart slidably mounted cylindric members capable of relative axial movement, said members having parts or flanges adapted to close said space and limit said movement, and a spring interposed between the said members adapted to act upon them in opposite directions.

3. In combination with a bearing having a rotating and a non-rotating part, of a packing for said bearing comprising two members spaced apart radially and capable of relative axial movement with respect to each other, one of said members having a radial flange thereon, a packing ring carried by said flange between it and the non-rotating part of the bearing, said members having parts adapted to close the space between them, and means for separating said members axially.

4. In combination with a bearing having a rotating and a non rotating part, of a packing for said bearing comprising two slidably mounted cylindric members capable of relative axial movement, said members having parts for limiting said movement, one of said members having a radial flange thereon, a packing ring carried by said flange between it and the non rotating part of the bearing, and a spring interposed between the said members adapted to act upon them in opposite directions.

5. In combination with a bearing having a rotating and a non rotating part, of a packing for said bearing comprising two slidably mounted cylindric members, one of said members having a radial flange thereon, a packing ring carried by said flange between it and the non rotating part of said bearing, the other of said members being adapted to have its edge only contact with the rotating part of the bearing and means adapted to force the two packing members axially apart.

6. A packing for bearings comprising two spaced apart cylindric members capable of relative axial movement, one of said members having two flanges, one flange being adapted to close said space and limit said movement, together with means interposed between the said second flange and the other member adapted to act upon said members in opposite directions tending to force them apart.

7. In combination with a bearing having a bearing sleeve and a rotating member, of a packing for said bearing comprising a disk member, means for forcing the outer edge of said disk member tightly against the inner surface of the bearing sleeve, a cylindric member capable of relative axial movement with respect to the disk member and tightly fitted thereon, and means adapted to produce a contact between the edge of the cylindric member and the said rotating member of the bearing.

8. A packing for bearings comprising two members spaced radially apart and capable of relative axial movement with relation to each other, and means carried by said members adapted to separate them axially, said members having parts adapted to close the space between them and limit their axial separation.

9. In combination with a bearing having a bearing sleeve and a rotating member, of a packing for said bearing comprising a disk member, means for providing a close fit between the disk member and the bearing sleeve, a cylindric member capable of relative axial movement with respect to the disk member and fitted in close relation thereto, and means adapted to produce a contact between the edge of the cylindric member and the said rotating member of the bearing.

10. A packing for bearings comprising two members spaced apart radially and capable of relative axial movement with respect to each other, and means for separating said members axially, said members having parts adapted to close the space between them, substantially as described.

In testimony whereof I have signed my name to this specification in the presence of two subscribing witnesses.

RUDOLF RODERWALD.

Witnesses:
　WOLDEMAR HAUPT,
　HENRY HASPER.

Copies of this patent may be obtained for five cents each, by addressing the "Commissioner of Patents, Washington, D. C."